(12) United States Patent
Nakano

(10) Patent No.: US 6,434,934 B1
(45) Date of Patent: Aug. 20, 2002

(54) BRAKE FLUID PRESSURE GENERATING APPARATUS

(75) Inventor: Toshihiro Nakano, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 4 days.

(21) Appl. No.: 09/670,578

(22) Filed: Sep. 27, 2000

(30) Foreign Application Priority Data

Sep. 28, 1999 (JP) ............................................. 11-273514
Nov. 24, 1999 (JP) ............................................. 11-332893

(51) Int. Cl.⁷ .............................................. B60T 13/12
(52) U.S. Cl. ...................................... 60/547.1; 60/582
(58) Field of Search ............................... 60/547.1, 582; 91/376 R

(56) References Cited

U.S. PATENT DOCUMENTS 4,199,940 A * 4/1980 Mathues et al. ............... 60/582

6,012,288 A * 1/2000 Gualdoni et al. ............. 60/562

FOREIGN PATENT DOCUMENTS

DE 196 41 821 4/1998
DE 197 03 776 8/1998

\* cited by examiner

*Primary Examiner*—Edward K. Look
*Assistant Examiner*—Thomas E. Lazo
(74) *Attorney, Agent, or Firm*—Burns, Doane, Swecker & Mathis, LLP

(57) ABSTRACT

The object of the present invention is to provide a brake fluid pressure generating apparatus which has a master cylinder with supplemental pressure room which operates the master cylinder independently of a depression of a brake pedal without structure complication. To perform this object, a master cylinder piston slides over seal cups which are arranged on a master cylinder side.

6 Claims, 2 Drawing Sheets

BRAKE FLUID PRESSURE GENERATING APPARATUS

FIELD OF THE INVENTION

The present invention generally relates to a brake fluid pressure generating apparatus. More particularly, the apparatus is applied to a mobile that is equipped with the brake fluid circuit.

BACKGROUND OF THE INVENTION

In general, a vehicle brake system includes a brake booster and master cylinder to deliver a pressurized brake fluid to each wheel cylinder. The brake booster boosts the depression force to a brake pedal and outputs boosted force which is response to the depression of a brake pedal. The master cylinder converts the boosted force into a brake fluid pressure.

The engine vacuum tends to drop in the latest vehicle compared with the previous vehicle, on account of this reason a sufficient and/or stable boosted force is not generated utilizing a brake booster. To overcome the above-mentioned disadvantage, a pressure device which is used for traction control system is utilized for the brake system. In other words, a brake fluid in a reservoir tank is pressurized using the pressure device and then the pressurized brake fluid is supplied straight to each wheel cylinder.

The brake fluid amount in a master cylinder is increased by using supplemental pressure device and an excess amount of the brake fluid is existing in the brake fluid circuit. Therefore, when the brake pedal is released, the excesses amount of the brake fluid flows back to the master cylinder. The excess brake fluid operates a master cylinder piston from the initial position to unusual position. This movement damages seal materials in the master cylinder in which produces a fluid tight manner. Consequently, when the supplemental pressure device is utilized in the brake fluid circuit, a solid designed master cylinder seal structure is required. This will be a cause of a cost increase for the device.

A third pressure room is applied to the master cylinder to avoid supplemental pressure device disadvantage. In this construction, a brake fluid is supplied to the brake fluid independent of the primary brake fluid circuit. However, providing the third pressure room in the master cylinder complicates the structure of the master cylinder. Further, the third pressure room lengthens the size of the master cylinder.

The object of the present invention is to provide a brake fluid pressure generating apparatus which has a third pressure room with a simple structure and shortens the length of the master cylinder.

SUMMARY OF THE INVENTION

To achieve the subject matter of the present invention, a brake fluid pressure generating device composed of a brake booster which boosts the depression force to a brake pedal, a master cylinder that generates brake fluid pressure in response to the depression of the brake pedal using a master cylinder piston, a pressurized media introduction room defined between the brake booster and a master cylinder piston that operates the master cylinder independently of the brake booster and the master cylinder piston slides over a plurality of seal cups that are arranged on the master cylinder.

According to the invention, a brake fluid pressure regulation valve which is disposed between a reservoir tank and the pressurised media introduction room regulates the brake fluid d pressure from the pressurised media introduction room to the reservoir tank. This arrangement provides an appropriate brake fluid pressure to the wheel cylinders independently of the depressing of the brake pedal.

According to a further feature of the invention, the brake fluid pressure regulation valve has a cut off function that isolates the pressurised media introduction room from said reservoir tank. This specific arrangement provides substitutive function for a parking brake.

According to a further feature of the invention, the master cylinder piston is divided into two pieces and a cross section of the first master cylinder piston is relatively bigger than a cross section of the second master cylinder piston. This construction provides large pressurized brake fluid receiving section on the first master cylinder piston and minimizes a brake fluid pressure in the pressurised media introduction room to slide the first master cylinder piston.

BRIEF DESCRIPTION OF THE FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
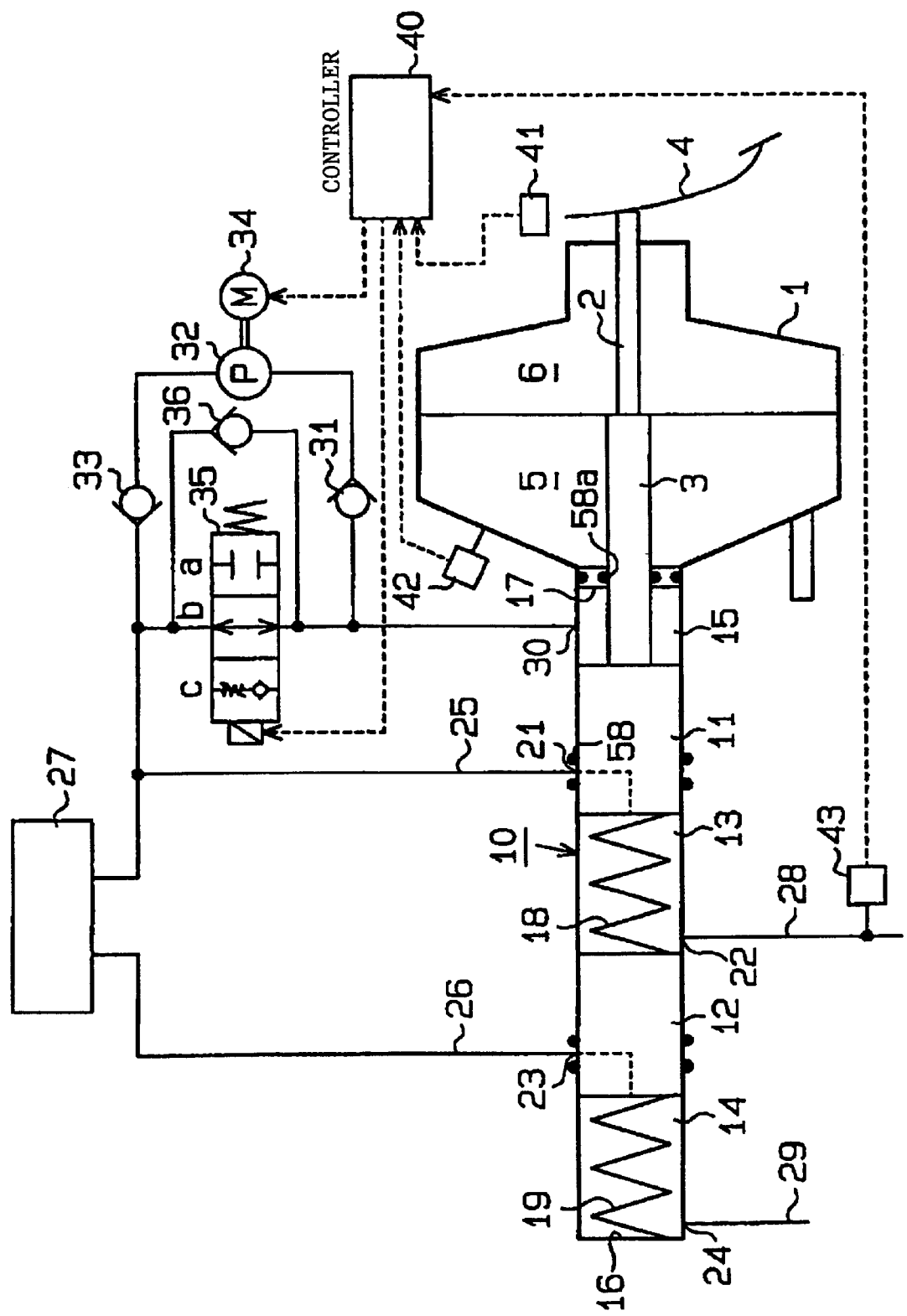
FIG. 1 is an fluid pressure circuit of the brake fluid pressure generating apparatus according to the invention.

This invention will be described in according to preferred embodiment which is shown in attached drawings. FIG. 1 shows a fluid circuit which contains the brake fluid pressure generating apparatus. A brake booster I has an input rod 2 and an output rod 3. A brake pedal 4 is linked to the input rod 2. A depression force, which is applied to the brake pedal 4, is transmitted to the output rod 3 by way of the input rod 2. In detail, when the brake pedal 4 is depressed, a pressure difference between a constant pressure chamber 5 and a variable pressure chamber 6 occurs in a brake booster 1 and in response to this pressure difference, an output force, which is generated in proportion to a brake pedal 4 depression force, is applied to the output rod 3. The output force from the output rod 3 is transmitted to the master cylinder 10. In this embodiment, the master cylinder 10 is a tandem type master cylinder.

The master cylinder 10 has a first master cylinder piston 11 and a second master cylinder piston 12 and three pressure rooms 13, 14 and 15 are formed by these pistons 11 and 12. The first pressure room 13 is formed between the first master cylinder piston 11 and the second master cylinder piston 12. The second pressure room 14 is formed between the second master cylinder piston 12 and an end wall 16 of master cylinder 10. The third pressure room 15 is formed between the first master cylinder piston 11 and a front end wall 17 of the master cylinder 10. In the first pressure room 13, a first spring 18 is disposed between the first master cylinder piston 11 and the second master cylinder piston 12. In the second pressure room 14, a second spring 19 is disposed between the first master cylinder piston 11 and the second master cylinder piston 12. In this embodiment, the first master cylinder piston 11 is used as master cylinder piston and the third pressure room 15 has a function as a pressurised media introduction room.

The master cylinder 10 has a first port 21, a second port 22, a third port 23 and a fourth port 24. The first and second ports 21 and 22 are communicated with the first pressure room 13. The third and fourth ports 23 and 24 are communicated with the second pressure room 14. The first and third ports 21 and 23 communicate with a reservoir tank 27 by way of fluid paths 25 and 26, respectively.

Therefore, the brake fluid, which is stored in the reservoir tank 27, is supplied to the first pressure room 13 through the fluid path 25 and the first port 21. Further, the brake fluid is supplied to the second pressure room 14 through the fluid path 26 and the third port 23.

The second port 22 which communicates with the first pressure room 13 is communicated with a not shown wheel cylinder through a fluid path 28. The fourth port 24 which communicates with the first pressure room 14 is communicated with the not shown wheel cylinder through a fluid path 29.

A front side (the brake booster 1 side) of the first master cylinder piston 11 is operatively connected to the output rod 3. In response to depression of the brake pedal 4, the first master cylinder piston 11 moves toward a rear side (opposite side of the brake booster 1 side) through the input rod 2 and the output rod 3. In response to this first master cylinder piston 11 movement, a communication between the first pressure room 13 and the first port 21 is controlled. In this condition, when the first master cylinder piston 11 further moves toward the rear side, the brake fluid in the first pressure room 13 is pressurized and the pressurized brake fluid is supplied to the wheel cylinder through the second port 22 and the fluid path 28.

When the brake fluid pressure in the first pressure chamber 13 is increased, the second master cylinder piston 12 moves toward a rear side. In response to this second master cylinder piston 12 movement, a communication between the second pressure room 14 and the second port 22 is controlled. In this condition, when the second master cylinder piston 12 further moves toward the rear side, the brake fluid in the second pressure room 14 is pressurized and the pressurized brake fluid is supplied to wheel cylinder through the fourth port 24 and the fluid path 29.

When the brake pedal 4 is released, the first and second pistons 1 1 and 12 return to initial position using fluid pressure, and a compression force of a first and second springs 18 and 19. Therefore, the first and third ports 21 and 23 communicate with the first pressure room 13 and the second pressure room 14, respectively. The fluid pressure, which is applied to the wheel cylinders, is released.

A fifth port 30, which communicates with the third pressure room 15, is formed in the master cylinder 10. The fifth port 30 communicates with the reservoir tank 27 through a first one-way valve 31, a fluid pump 32 and a second one-way valve 33. The fluid pump 32 is driven by an electric motor 34 and generates fluid pressure. The brake fluid in the reservoir tank 27 is applied to the third pressure room 15 through the second one-way valve 33, the fluid pump 32 and the first one-way valve 31. When a pressurized brake fluid is applied to the third pressure room 15, the first master cylinder piston 11 moves toward the rear side. In this construction, the first master cylinder piston 11 is independently controlled with the operation of the brake booster 1.

The fifth port 30 also communicates with the reservoir tank 27 through an electronic valve 35 and a third one-way valve 36 is connected to the electronic valve 35 in parallel.

The electronic valve 35 has three stage functions "a", "b" and "c" and functions as a brake fluid pressure regulation valve. When the electronic valve is positioned at "a", a communication between the third pressure room 15 and the reservoir tank 27 is cut off. When the electronic valve is positioned at "b", the third pressure room 15 and the reservoir tank 27 communicate with each other. When the electronic valve is positioned at "c", a communication between the third pressure room 30 and the reservoir tank 27 is regulated and brake fluid flow from the third pressure room 15 to the reservoir 27 is permitted.

A positioning of the electronic valve 35 and the electric motor 34 are controlled by a controller 40. A brake pedal sensor 41, a vacuum pressure sensor 42 and a fluid pressure sensor 43 are connected to the controller 40. The brake pedal sensor 41 detects a stroke of depression of the brake pedal 4 or detects the amount of the depression force of the brake pedal 4. In this embodiment, when the brake pedal 4 is depressed, the controller 40 drives the electric motor 34 and puts the electronic valve into the "a" or "c" position. When the brake pedal 4 is released, the controller 40 turns the electric motor 34 off and controls the electronic valve 35 in the "b" or "c" position in response to the actual returning condition of the brake pedal 4.

The vacuum pressure sensor 42 detects actual pressure in the constant pressure chamber 5 and the fluid pressure sensor 43 detects actual fluid pressure in the fluid path 28. In response to the signals from the sensors 42 and 43, the controller 40 computes the amount and the pressure of the brake fluid to the third pressure room 15. The electric motor 34 is operated in response to the sensors 42 and 43 using predetermined control program.

Figure 2:
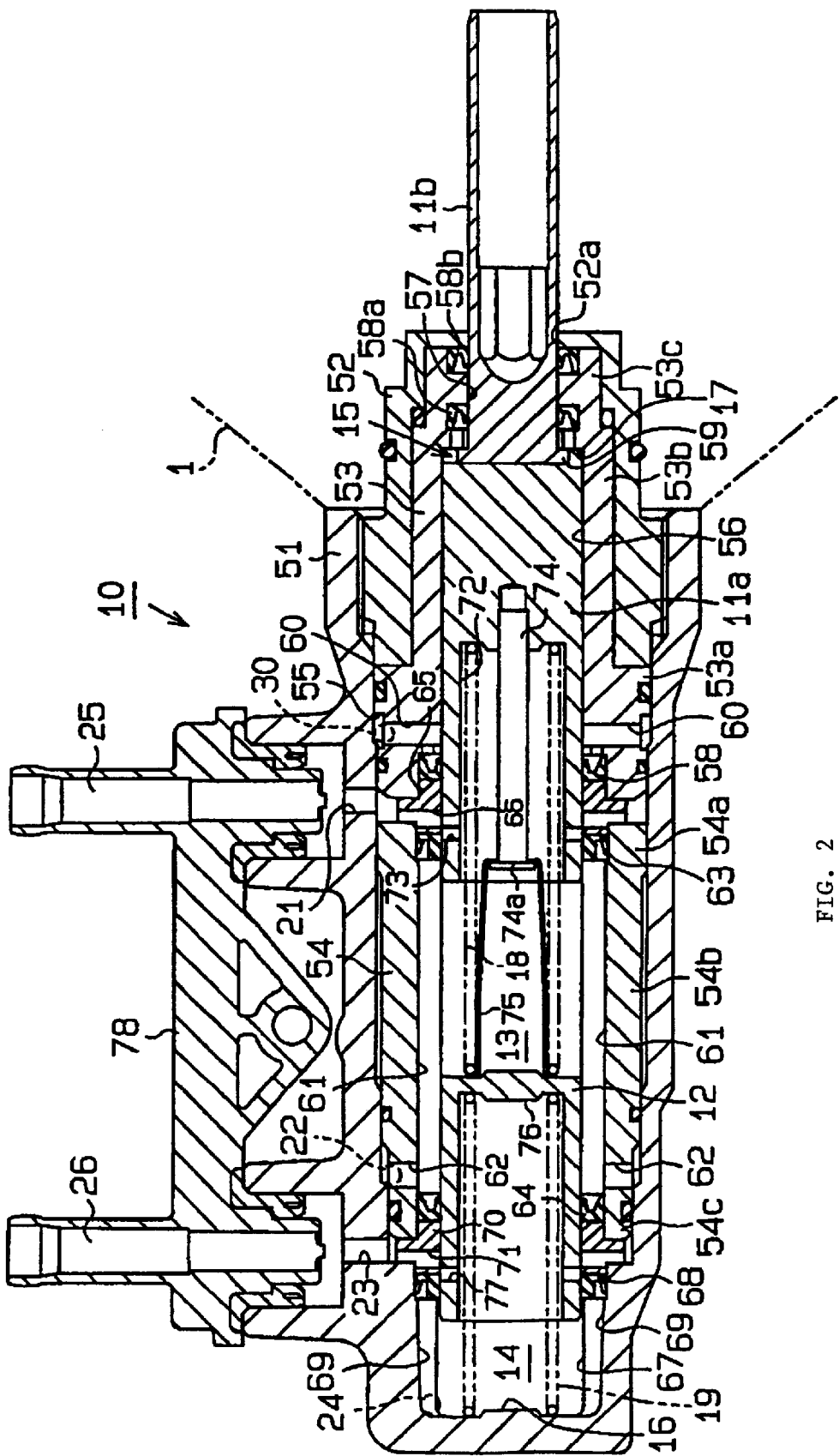
FIG. 2 is a cross sectional view of the master cylinder according to the invention.

The details of the construction of the master cylinder 10 are described with reference to FIG. 2. In FIG. 2, a main body 51 of the master cylinder 10 has a cylindrical shape and has an opening and bottom wall. A cover 52 is screwed and is fixed to the opening of the main body 51. The brake booster 1 is mounted on the cover 52. A cylindrical first sleeve 53 and a cylindrical second sleeve 54 are disposed in the inner space which is formed by the main body and the cover 52.

The first sleeve 53, which forms the pressurised media introduction room (the third pressure room 15), has a large diameter portion 53a, a medium diameter portion 53b and a small diameter portion 53c. The large diameter portion 53a is supported by the inner wall of the main body 51. The medium diameter portion 53b and the small diameter portion 53c are supported by the inner wall of the cover 52. A continuous groove 55 is formed at the outer surface of the large diameter portion 53a of the first sleeve 53. The fifth port 30 is formed on the opposite side of the main body 51.

The first sleeve 53 has a first inner room 56 and a second inner room 57 which have different diameters from each other. The first inner room 56 is formed at the large diameter portion 53a and a medium diameter portion 53b and a large first master cylinder piston 11a is arranged in the first inner room 56. A fluid seal cup 58 is arranged at a step shaped portion of the large diameter portion 53a. A fluid tight manner between the large first master cylinder piston 11a and the first sleeve 53 is established.

The second inner room 57 is smaller than the first inner room 56 at its diameter. The second inner room 57 is formed at the small diameter portion 53c and a small first master cylinder piston 11b is supported at the second inner room 57. Therefore, the small first master cylinder piston 11b slides over the first sleeve 53. The diameter of the first master cylinder piston 11a is relatively bigger than the second master cylinder piston 11b. In this embodiment, the first master cylinder piston 11 is composed of the large first master cylinder piston 11a and the small first master cylinder piston 11b and each piston 11a and 11b can move independently. A continuous groove is formed on the inner surface of the second inner room 57, and a seal cup 58a is disposed in the groove. A fluid seal cup 58b is also arranged at a step shaped portion, which is formed at the end of the first sleeve 53, of the small diameter portion 53c. A fluid tight manner between the small first master cylinder piston 11b and the first sleeve 53 is established by seal cups 58a and 58b.

One end of the small first master cylinder piston 11b is connected to the output rod 3 through an opening 52a which is formed at the end of the cover 52. A flange 59 is formed at the other end of the small first master cylinder piston 11b. The flange 59 is positioned in the first inner room 56 and the diameter of the flange 59 is bigger than diameter of the second inner room 57. However, the diameter of the flange 59 is smaller than diameter of the first inner room 56. The flange 59 of the small first master cylinder piston 11b contacts with the large first master cylinder piston 11a.

The third pressure room 15 is formed by end wall of the large first master cylinder piston 11a, an outer surface of the flange 59, an inner surface of the first inner room 56 and the front end wall 17. A diameter of the first inner room 56 is a little larger than the diameter of the large first master cylinder piston 11a. Therefore, a clearance is defined between the first sleeve 53 and the large first master cylinder piston 11a. A first fluid path 60 is formed between the continuous groove 55 and the first inner room 56. Therefore, the third pressure room 15 communicates with the fifth port 30 through the clearance between the first sleeve 53 and the large first master cylinder piston 11a, the first fluid path 60 and the continuous groove 55.

In accordance with the movement of the output rod 3 of the brake booster 1, the large first master cylinder piston 11a slides toward the rear side together with the small first master cylinder piston 11b. In this condition, if the fluid pressure is introduced from the fifth port 30, the large first master cylinder piston 11a slides toward the rear side utilizing the fluid pressure in the third pressure room 15.

Without movement of the output rod 3 of the brake booster 1, for instance, if the fluid pressure is introduced from the fifth port 30, the large first master cylinder piston 11a slides toward the rear end only using the fluid pressure which is introduced in the third pressure room 15. In this condition, the fluid pressure in the third pressure room 15 is applied to a cross section of the large first master cylinder piston 11a. When the large first master cylinder piston 11a is apart from the small first master cylinder piston 11b and the small first master cylinder piston 11b slides in response to the movement of the output rod 3, the fluid pressure in the third pressure room 15 is increased. Therefore, the large first master cylinder piston 11a further slides to the rear end.

The second sleeve 54 has a large diameter portion 54a, a medium diameter portion 54b and a small diameter portion 54c and the second sleeve 54 is disposed in the main body 51. The large first master cylinder piston 11a and the second master cylinder piston 12 are arranged in the inner surface of the second sleeve 54. A space that is defined between the large first master cylinder piston 11a and the second master cylinder piston 12 is the first pressure room 13.

A first groove 61 is formed on the inner surface of the second sleeve 54. The first groove 61 is formed along the center axis of the second groove 54. A second fluid path 62 is formed on the small diameter portion 54c of the second sleeve 54 and an outer surface of the second sleeve 54 communicates with the first groove 61 through the second fluid path 62. The second fluid path 62 communicates with the second port 22. Therefore, the first pressure room 13 communicates with the second port 22 through the first groove 61 and the second fluid path 62.

A step portion is formed at the each end of the second sleeve 54, and a seal cup 63 and 64 are arranged on the step portion. A first guide member 65 is arranged between the first sleeve 53 and the second sleeve 54. The first guide member 65 is cylindrical and the large first master cylinder piston 11a is slidably arranged on the inner surface of the first guide member 65. Both ends of the first guide member 65 have a relatively small diameter compared with the middle portion of the first guide member 65 and either end of the first guide member 65 is close to the seal cups 58 and 63. A fluid tight manner between the large first master cylinder piston 11a and the first sleeve 53, a fluid tight manner between the large first master cylinder piston 11a and the second sleeve 53 are established utilizing the seal cup 58 and 63. A third fluid path 66 is formed between an inner surface and an outer surface of the first guide member 65. The third fluid path 66 communicates with the first port 21 through the clearance which is defined between first and second sleeve 53 and 54.

A concave portion 67 is formed at the rear side of the main body 51 and the concave portion 67 accepts the second master cylinder piston 12. A step portion is formed at the opening portion of the concave portion 67, and a seal cup 68 is disposed on the step portion. The second pressure room 14 is defined between the concave portion 67 and the second master cylinder piston 12. A second groove 69 is formed on the inner surface of the concave portion 69. The second groove 69 is formed along the center axis of the main body 51. The second groove 69 communicates with the fourth port 24. Therefore, the second pressure room 14 communicates with the fourth port 24 through the second groove 69.

A second guide member 70 is arranged between the second sleeve 54 and the concave portion 69. The second guide member 70 is cylindrical and the second master cylinder piston 12 is slidably arranged on the inner surface of the second guide member 70. Both ends of the second guide member 70 have a relatively small diameter compared with the middle portion of the second guide member 70 and either end of the second guide member 70 is close to the seal cups 64 and 68. A fluid tight manner between the second master cylinder piston 12 and the second sleeve 54, a fluid tight manner between the second master cylinder piston 12 and the main body are established utilizing the seal cup 64 and 68. A fourth fluid path 71 is formed between an inner surface and an outer surface of the second guide member 70. The fourth fluid path 71 communicates with the third port 23.

The large first master cylinder piston 11a has a concave portion 72 and a first communication port 73 is formed on the sidewall of the large first master cylinder piston 11a. When the first large piston 1Ia is placed at an initial position (no operating condition), the first pressure room 13 communicates with the first port 21 through the concave portion 72 and the third fluid path 66. When the large first master cylinder piston 11a slides into the rear side, the first communication port 73 slides into the left side of the seal cup 63. Therefore, the first pressure room 13 discommunicates with the first port 21.

A guide rod 74 is disposed and fixed at the center portion of the concave portion 72 and a receiving seat 75 engages with the guide rod 74. The guide rod 74 has a flange 74a. The flange 74a engages with the receiving seat 75 and regulates movement in the front side direction. The receiving seat 76 has a bending portion in the rear side and the first spring 18 is disposed between the bending portion of the receiving seat 75 and a bottom of the concave portion 72 with predetermined compression. The first spring 18 applies a compression force to the second master cylinder piston 12. Therefore, if the first master cylinder piston 11 slides to the rear side, the second master cylinder piston 12 slides into rear side direction.

The second master cylinder piston 12 has a concave portion 76 and the second spring 19 is disposed between the concave portion 76 and the end wall 16 with predetermined compression. A second communication port 77 is formed on the sidewall of the second master cylinder piston 12. When the second master cylinder piston 12 is placed at an initial position (no operating condition), the second pressure room 14 communicates with the third port 23 through the concave portion 76, the second communication port 77 and the fourth fluid path 71. When the second master cylinder piston 12 slides into the rear side, the second communication port 77 slides into the left side of the seal cup 68. Therefore, the second pressure room 14 discommunicates with the third port 23.

A union 78, which connects to the reservoir tank 27, is attached to the main body 51. The union 78 has fluid paths 26 and 26. The fluid path 25 communicates with the first port 21 and the fluid path 26 communicates with the third port 23.

The following are features of the brake fluid pressure generating apparatus.

In this embodiment, the third pressure room 15 is formed in the master cylinder 10 and the brake fluid is supplied to the third pressure room 15 by the fluid pump 32. The first master cylinder piston 11 (the large first master cylinder piston 11a) is driven when the brake fluid is supplied into the third pressure room 15 without depression of the brake pedal 4 and/or operation of the brake booster 1. Therefore, even if the brake booster 1 is under a disabled and/or unstable condition, the master cylinder 10 generates stable operation by using the brake fluid which is supplied into the third pressure room 15 by the fluid pump 32.

In this embodiment, the controller 40 controls the electric motor 34 and drives the fluid pump 32 in response to the depression of the brake pedal 4 which is detected by the brake pedal sensor 41. When the brake pedal 4 is depressed, the controller 40 drives the electric motor 34 and puts the electronic valve into the "a" or "c" position. When the brake pedal 4 is released, the controller 40 turns the electric motor 34 off and controls the electronic valve 35 in the "b" or "c" position in response to actual returning condition of the brake pedal 4. Therefore, the master cylinder 10 is accurately controlled in response to the depression of the brake pedal 4.

In this embodiment, the master cylinder 10 is operated without depression of the brake pedal 4 by supplying the brake fluid into the third pressure room 15. Namely, the master cylinder 10 is operated without the brake booster 1. If the controller 40 computes and/or detects a driving condition accurately, the present brake fluid pressure generating apparatus is applicable to an automatic brake control system by using various driving conditions.

In this embodiment, when the electronic valve 35 is placed in the "a" position, the third pressure room 15 is disconnected from the reservoir tank 27. When the brake fluid is supplied to the third pressure room 15 and then the electronic valve 35 is placed in the "a" position, the apparatus functions as a parking brake while the vehicle is parking.

In this embodiment, the brake fluid pressure in the third pressure room 15 is regulated when the electronic valve 35 is placed in the "c" position. An appropriate braking force is generated when the brake fluid is supplied into the third pressure room 15 under the vehicle parking.

In this embodiment, the brake fluid is supplied into a closed fluid circuit which is comprised of the third pressure room 15, the fluid pump 32, the electronic valve 35 and plurality of one-way valves 31, 33, 36. Therefore, the brake fluid, which is supplied into the third pressure room 15, does not come into a main brake fluid circuit. The main brake fluid circuit is connected to the wheel cylinders. Though the brake fluid is supplied into the third pressure room 15, the amount of the brake fluid in the main brake fluid circuit is not increased. Consequently, it is not need to make strong the fluid tight manner of the master cylinder 10.

In this embodiment, the first master cylinder piston 11 is divided into the large first master cylinder piston 11a and the small first master cylinder piston 11b, the brake fluid is applied cross section of the large first master cylinder piston 11a. Namely, the large first master cylinder piston 11a is operated by relatively low brake fluid pressure. As a result, relatively low capacity fluid pump 32 would apply this embodiment and no need to make the master cylinder 10 strong.

In this embodiment, the seal cups 58, 63, 58a and 58b are arranged on the first sleeve 53 and the second sleeve 63, respectively. The fluid tight manner in the third pressure room 15 is established by the seal cups 58 and 58a. The seal cup 58 establishes the fluid tight manner between the large first master cylinder piston 11a and the first sleeve 53. The seal cup 63 establishes the fluid tight manner between the large first master cylinder piston 11a and the second sleeve 54. The seal cups 64 and 68 are arranged on the second sleeve 54 and the concave portion 67 of the main body 51, respectively. The seal cup 64 establishes the fluid tight manner between the second master cylinder piston 12 and the second sleeve 54. The seal cup 68 establishes the fluid tight manner between the second master cylinder piston 12 and the main body 51. Therefore, this seal cup arrangement shortens the length of the master cylinder 10 compared with a conventional type master cylinder. In the conventional type master cylinder, the seal cups are arranged on the pistons 11 and 12.

Though the third pressure room 15 lengthen the size of the master cylinder 10 comparing with the conventional type master cylinder, the arrangement of the seal cups of this embodiment shortens the length of the master cylinder 10. There is no seal cups on the first master cylinder piston 11, so the first master cylinder piston 11 is placed close to the second master cylinder piston 12. This placement enables the length of the master cylinder 10 to be shortened.

While the seal cups 58 and 58a are arranged on the first sleeve 53, the fifth port 30 and the first fluid path 60 are designed at any position between the seal cup 58 and the seal cup 58b. In this arrangement, the third pressure room 16 is able to be placed in the brake booster 1 and the length of the entire brake fluid pressure generation apparatus is shortened.

The embodiment of the present invention is not limited above mentioned embodiment and some modifications would be able to apply.

In this embodiment, the first piston is divided into two pieces, however the piston can be designed as a one piece body. In this modified embodiment, a reaction force which is applied to the output rod 3 into the front side through the small first master cylinder piston 11 b is not generated. This invention would be able to apply to the master cylinder which has a sole piston. A electronic controlled proportional valve applies to this embodiment for three stage electronic valve 35. The first sleeve 53 and the cover 52 can be designed as one body.

In accordance with features of the present invention, the length and/or size of the master cylinder is shortened. Further, an appropriate braking force is generated without depression of the brake pedal. Further more, the first piston slides into rear side without using relatively high brake fluid pressure.

What is claimed is:

1. A brake fluid pressure generating device comprising:
   a brake booster which boosts the depression force to a brake pedal;
   a master cylinder that generates brake fluid pressure in response to depression of the brake pedal using a master cylinder piston; and
   a pressurized media introduction room defined between said brake booster and the master cylinder piston that operates said master cylinder independently of said brake booster,
   wherein said master cylinder piston slides over a plurality of seal cups that are arranged on said master cylinder side, and
   wherein a brake fluid pressure regulation valve is disposed between a reservoir tank and said pressurized media introduction room and a brake fluid pressure in said pressurized media introduction room is regulated by said brake fluid pressure regulation valve.

2. A brake fluid pressure generating device as set forth in claim 1, wherein said brake fluid pressure regulation valve is disposed between a reservoir tank and said pressurized media introduction room and a brake fluid pressure in said pressurized media introduction is regulated by said pressure regulation valve.

3. A brake fluid pressure generating device as set forth in claim 2, wherein said brake fluid pressure regulation valve has a plurality of operation stages.

4. A brake fluid pressure generating device as set forth in claim 3, wherein said brake fluid pressure regulation valve has a cut off function that isolates said pressurized media introduction room from said reservoir tank.

5. A brake fluid pressure generating device comprising:
   a brake booster which boosts the depression force to a brake pedal;
   a master cylinder that generates brake fluid pressure in response to depression of the brake pedal using a master cylinder piston; and
   a pressurized media introduction room defined between said brake booster and the master cylinder piston that operates said master cylinder independently of said brake booster,
   wherein said master cylinder piston slides over a plurality of seal cups that are arranged on said master cylinder side,
   wherein said master cylinder piston has a first and a second master cylinder piston, and
   a cross section of said larger cross section portion of said master cylinder piston is relatively bigger than a cross section of said smaller cross section portion of said master cylinder piston.

6. A brake fluid pressure generating device comprising:
   a brake booster which boosts the depression force to a brake pedal;
   a master cylinder that generates brake fluid pressure in response to depression of the brake pedal using a master cylinder piston; and
   a pressurized media introduction room defined between said brake booster and a master cylinder piston that operates said master cylinder independently of said brake booster,
   wherein said master cylinder piston slides over a plurality of seal cups that are arranged on said master cylinder side,
   wherein atleast a portion of said master cylinder piston is arranged in a first sleeve that is fixed on said master cylinder and a clearance between said first sleeve and said atleast a portion of said master cylinder piston allows brake fluid flow.

* * * * *